United States Patent
Cichocki et al.

(10) Patent No.: US 12,451,310 B2
(45) Date of Patent: Oct. 21, 2025

(54) SOLID STATE RELAY MODULE HEATING SYSTEM AND METHODS

(71) Applicant: nVent Services GmbH, Schaffhausen (CH)

(72) Inventors: Arkadiusz Cichocki, Wroclaw (PL); Artur Koziol, Dzierzoniow (PL); Wojciech Tuchorski, Dzierzoniow (PL)

(73) Assignee: Chemelex Europe GmbH, Schaffhausen (CH)

( * ) Notice: Subject to any disclaimer, the term of this patent is extended or adjusted under 35 U.S.C. 154(b) by 861 days.

(21) Appl. No.: 17/706,427

(22) Filed: Mar. 28, 2022

(65) Prior Publication Data

US 2022/0310338 A1 Sep. 29, 2022

Related U.S. Application Data (60) Provisional application No. 63/166,541, filed on Mar. 26, 2021.

(51) Int. Cl.
*H01H 50/12* (2006.01)
*H01H 50/02* (2006.01)

(52) U.S. Cl.
CPC ............. *H01H 50/12* (2013.01); *H01H 50/02* (2013.01)

(58) Field of Classification Search
CPC ........ H05B 1/023; H01H 50/12; H05K 7/207; H05K 7/20545
See application file for complete search history.

(56) References Cited

U.S. PATENT DOCUMENTS

| | | | |
|---|---|---|---|
| 2,693,822 A | 11/1954 | Gerow et al. | |
| 3,027,916 A | 4/1962 | Smith | |
| 3,541,433 A | 11/1970 | Davis | |
| 3,714,515 A | 1/1973 | Lee | |
| 5,598,322 A * | 1/1997 | Von Arx | H02B 1/26 |
| | | | 361/810 |
| 5,794,795 A | 8/1998 | Stemmons | |
| 6,127,660 A * | 10/2000 | Scafati | G05D 23/1931 |
| | | | 219/486 |
| 6,563,710 B1 | 5/2003 | Okuda et al. | |
| 6,841,739 B2 * | 1/2005 | Moore | H05K 1/0393 |
| | | | 219/209 |
| 8,322,541 B2 | 12/2012 | Maclaren-Taylor | |
| 8,472,194 B2 | 6/2013 | Rivera Hernandez et al. | |
| 9,795,067 B2 | 10/2017 | Takezawa et al. | |

(Continued)

FOREIGN PATENT DOCUMENTS

| | | |
|---|---|---|
| CN | 2268357 Y | 11/1997 |
| CN | 201464937 U | 5/2010 |

(Continued)

*Primary Examiner* — Thien S Tran
(74) *Attorney, Agent, or Firm* — Quarles & Brady LLP (57) ABSTRACT

A solid state relay module configured to be coupled to an electronics enclosure. The solid state relay module includes a body with a first side and an opposite second side and two cable channels extending from the first side of the body. Each of the two cable channels is sized to receive a heating cable. The solid state module also includes a solid state relay platform defined between the two cable channels, where the solid state relay platform is sized to receive a solid state relay. The solid state relay module further includes a heat sink extending from the second side of the body.

20 Claims, 9 Drawing Sheets

(56) References Cited

U.S. PATENT DOCUMENTS

| | | | |
|---|---|---|---|
| 10,111,360 | B2 | 10/2018 | Perrin et al. |
| 10,819,089 | B2 | 10/2020 | Naumann et al. |
| 2005/0006053 | A1 | 1/2005 | Apfelbacher et al. |
| 2010/0196908 | A1* | 8/2010 | Opalsky .................... B01L 7/52 435/6.1 |
| 2011/0073668 | A1* | 3/2011 | Garber .................. G05D 23/19 236/101 R |
| 2011/0273844 | A1 | 11/2011 | Rivera et al. |
| 2017/0041987 | A1 | 2/2017 | Weber et al. |
| 2019/0305528 | A1* | 10/2019 | Naumann ............ H05B 3/0019 |
| 2019/0320502 | A1* | 10/2019 | Dong ....................... B63B 35/44 |
| 2020/0267870 | A1 | 8/2020 | Dong et al. |

FOREIGN PATENT DOCUMENTS

| | | |
|---|---|---|
| CN | 104166414 A | 11/2014 |
| CN | 203984828 U | 12/2014 |
| CN | 106159847 A | 11/2016 |
| CN | 102901214 B | 12/2016 |
| CN | 106840450 A | 6/2017 |
| CN | 208782268 U | 4/2019 |
| CN | 210778330 U | 6/2020 |
| CN | 111565530 A | 8/2020 |
| DE | 1968194 U | 9/1967 |
| DE | 2534800 A1 | 4/1976 |
| DE | 4318674 A1 | 12/1993 |
| DE | 29802057 U1 | 6/1998 |
| EP | 1047168 B1 | 6/2006 |
| EP | 2190277 A1 | 5/2010 |
| JP | 2016-127624 A | 7/2016 |
| KR | 10-1637011 B1 | 7/2016 |
| RU | 2007125894 A | 1/2009 |
| RU | 2013138640 A | 2/2015 |
| WO | 2012/008713 A2 | 1/2012 |
| WO | 2016/146485 A1 | 9/2016 |
| WO | 2016/146490 A1 | 9/2016 |
| WO | 2017010898 A1 | 1/2017 |
| WO | 2022/136663 A1 | 6/2022 |

* cited by examiner

SOLID STATE RELAY MODULE HEATING SYSTEM AND METHODS

CROSS-REFERENCE TO RELATED APPLICATIONS

The application claims the benefit of U.S. Provisional Patent Application 63/166,541 filed Mar. 26, 2021, and entitled "Solid State Relay Module Heating System and Method," which is incorporated herein by reference in its entirety.

BACKGROUND

Electronics modules such as temperature controllers can be housed in or on weatherproof enclosures and used in outdoor environments. In extreme environments, these environments may reach temperatures as low as −55 degrees Celsius (° C.) or even colder. Electronic components however, are usually only rated for operation in temperatures of −40° C. or warmer, and may malfunction or even suffer permanent damage if operated at excessively low temperatures. Thus, to enable operation at very low temperatures, some enclosures may require electric heater assemblies to preheat the electronics to a safe operating temperature.

SUMMARY

Some embodiments of the invention provide a solid state relay module configured to be coupled to an electronics enclosure. The solid state relay module includes a body with a first side and an opposite second side and two cable channels extending from the first side of the body. Each of the two cable channels is sized to receive a heating cable. The solid state relay module also includes a solid state relay platform defined between the two cable channels, where the solid state relay platform is sized to receive a solid state relay. The solid state relay module further includes a heat sink extending from the second side of the body.

Some embodiments of the invention provide a solid state relay module configured to be coupled to an electronics enclosure, the solid state relay module. The solid state relay module includes a body with a first side and an opposite second side and a cable channel extending from the first side of the body. The cable channel sized to receive a heating cable. The solid state relay module also includes a solid state relay platform positioned adjacent to the cable channel, where the solid state relay platform sized to receive a solid state relay. The solid state relay module further includes a heat sink extending from the second side of the body.

Some embodiments of the invention provide a system comprising an electronics enclosure, a solid state relay module, and a control system. The solid state relay module is configured to be coupled to the electronics enclosure and includes a solid state relay and a heating cable. The control system is configured to receive a first signal representing a temperature within the electronics enclosure, operate the solid state relay when the temperature within the electronics enclosure is at or above a first temperature, and operate the heating cable when the temperature within the electronics enclosure is below a second temperature.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Figure 1:
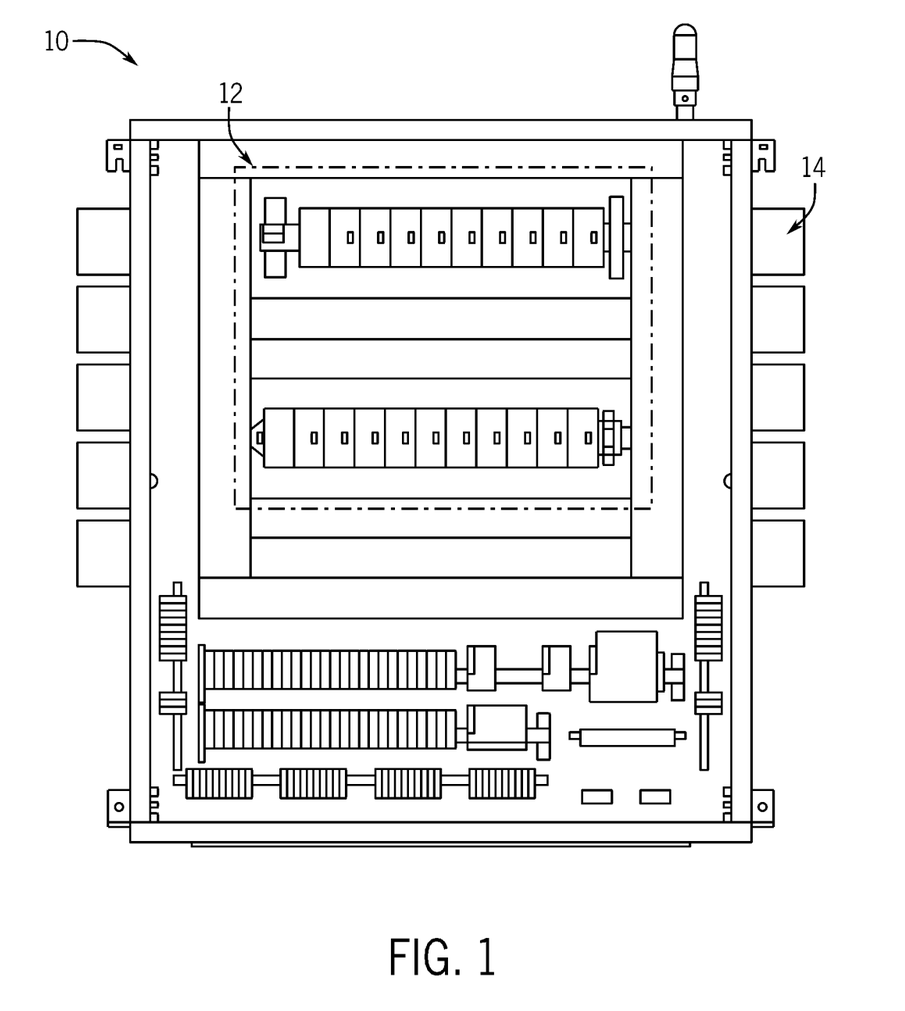
FIG. 1 is a front, internal view of an electronics enclosure.

FIG. 1 illustrates an electronics enclosure 10 configured to mount electronic equipment. The enclosure 10 can support electronics 12 internally, such as internally mounted temperature controllers, wire terminals, or other electronics, as well as support electronics externally, such as externally mounted solid state relays (SSRs) 14. That is, the SSRs 14 may be mounted along the enclosure 10 to interface with an outside of the enclosure 10. In some applications, this type of enclosure 10 may be used in certain environments, such as arctic environments or oil platform environments. These environments often encounter extreme temperatures (e.g., below −40° C.) that may cause malfunctions in electronic equipment 12, 14, supported by the enclosure 10. That is, such electronics 12, 14 may not be rated to withstand such cold temperatures. Furthermore, in warmer temperatures, heat generated by the SSRs 14 may become trapped within the electronics enclosure 10, negatively affecting other electronics 12 therein. As further described below, some embodiments provide one or more SSR modules that are configured as all-weather modules capable of heating or cooling SSRs 14, as necessary.

Figure 2:
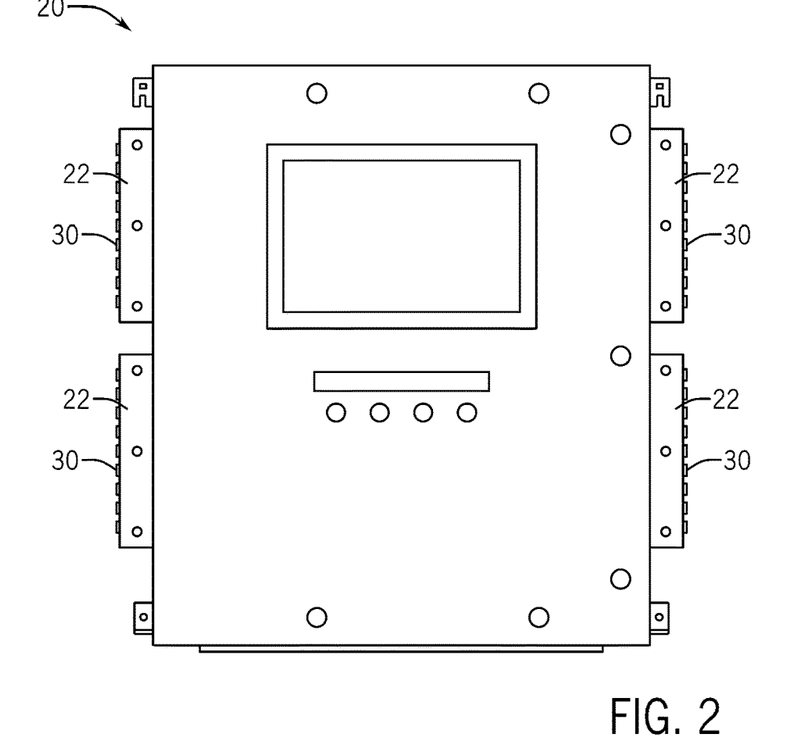
FIG. 2 is a front view of an electronics enclosure including a plurality of SSR modules according to some embodiments.
Figure 3:
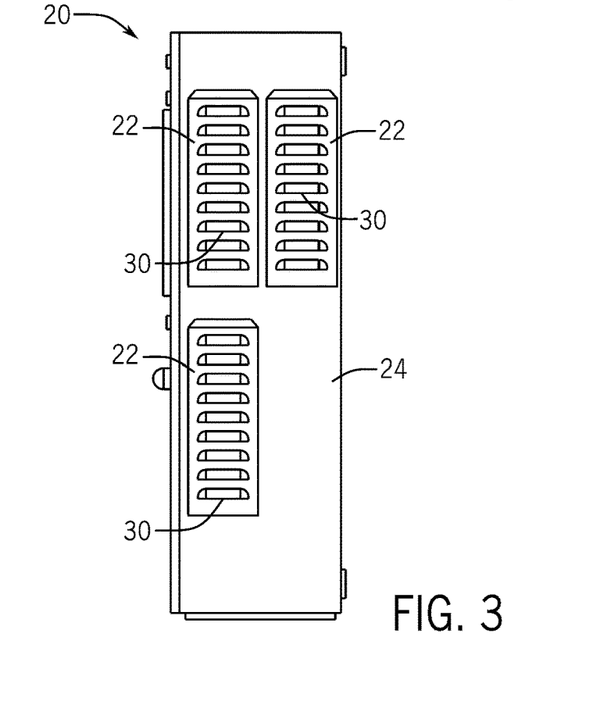
FIG. 3 is a side view of the electronics enclosure of FIG. 2.

For example, FIGS. 2 and 3 illustrate an electronics enclosure 20 that can include one or more SSR modules 22, according to some embodiments. Each SSR module 22 can be coupled to a wall 24 of the electronics enclosure 20 and can receive one or more SSRs 14, such as one, two, three, or more SSRs 14. For example, in some applications, the electronics enclosure 20 can include electronics for controlling and/or monitoring external heat trace cables. Each SSR module 22 can accommodate three SSRs 14 required for switching of three-phase power for such heat trace cables.

According to some embodiments, as shown in FIGS. 4-12, each SSR module 22 can include an SSR platform 26, a heat sink 28, and a cover 30. Furthermore, each SSR module 22 can include one or more SSRs 14, one or more thermal pads 32, one or more mounting plates 34, and fasteners 36. Additionally, each SSR module 22 can include one or more heating cables 38 configured to provide localized heating to the SSRs 14 on the SSR platform 26. Generally, the SSR module 22 can be coupled to the electronics enclosure 20. For example, the SSR module 22 can be mounted within the electronics enclosure 20 so that the SSRs 14 extend into the electronics enclosure 20 and interfaced to an outside of the electronics enclosure 20, so that at least the heat sink 28 extends out of the electronics enclosure 20 as a means to release heat generated by the SSRs 14 out of the electronics enclosure 20, and the cover 30 is generally positioned outside of the electronics enclosure 20 to cover the heat sink 28.

Figure 9:
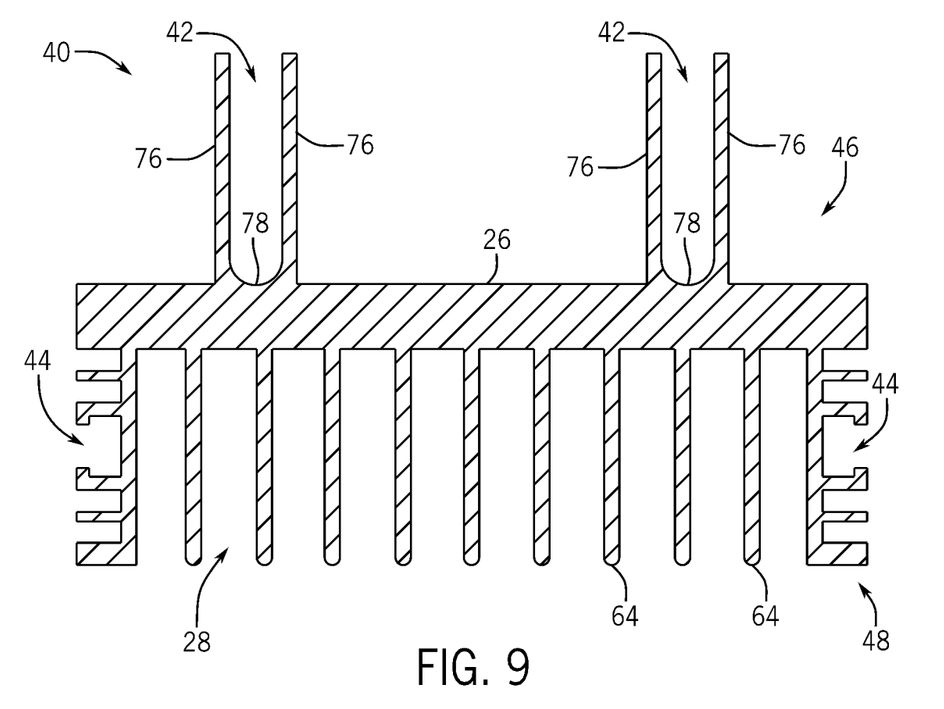
FIG. 9 is a top view of a body of the SSR module of FIG. 4.

In some embodiments, at least the SSR platform 26 and the heat sink 28 can be formed integrally as a single, one-piece base 40, as shown in FIG. 9. That is, as shown in FIG. 9, the base 40 can include the SSR platform 26 and the heat sink 28, as well as cable channels 42, and, optionally, one or more cover mounting sections 44. The SSR platform 26 can be positioned between two parallel cable channels 42 on a first side 46 of the base 40, and the heat sink 28 and the cover mounting sections 44 can be positioned on a second, opposite side 48 of the base 40.

Figure 4:
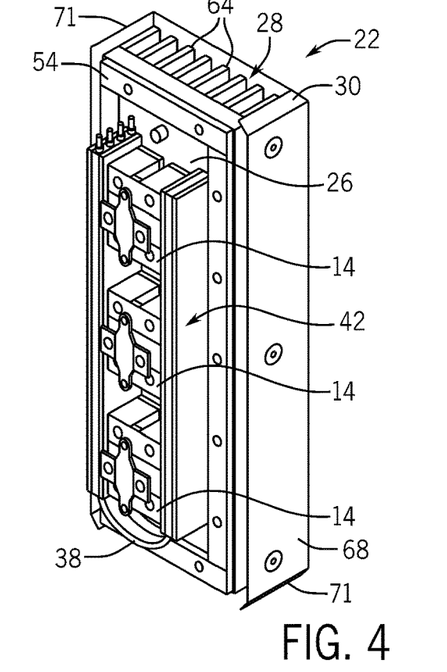
FIG. 4 is a front isometric view of an SSR module according to some embodiments.
Figure 5:
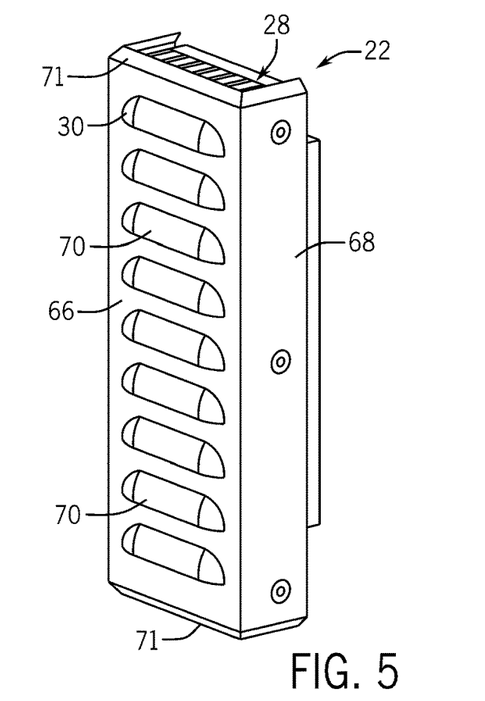
FIG. 5 is a rear isometric view of the SSR module of FIG. 4.
Figure 6:
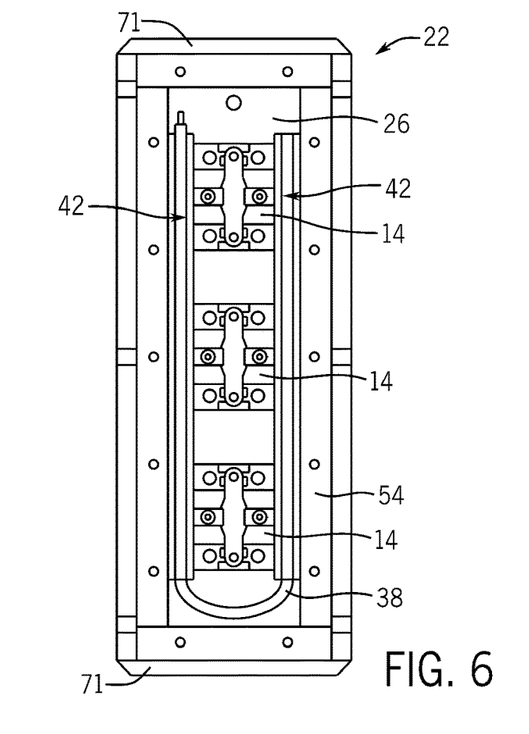
FIG. 6 is a front view of the SSR module of FIG. 4.
Figure 7:
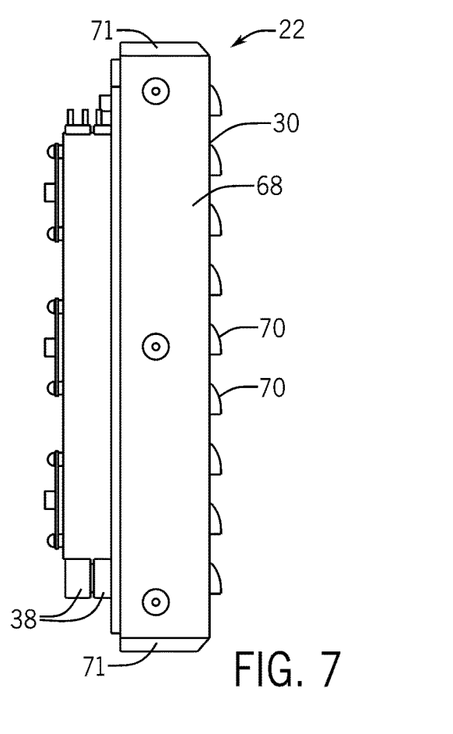
FIG. 7 is a side view of the SSR module of FIG. 4.
Figure 8:
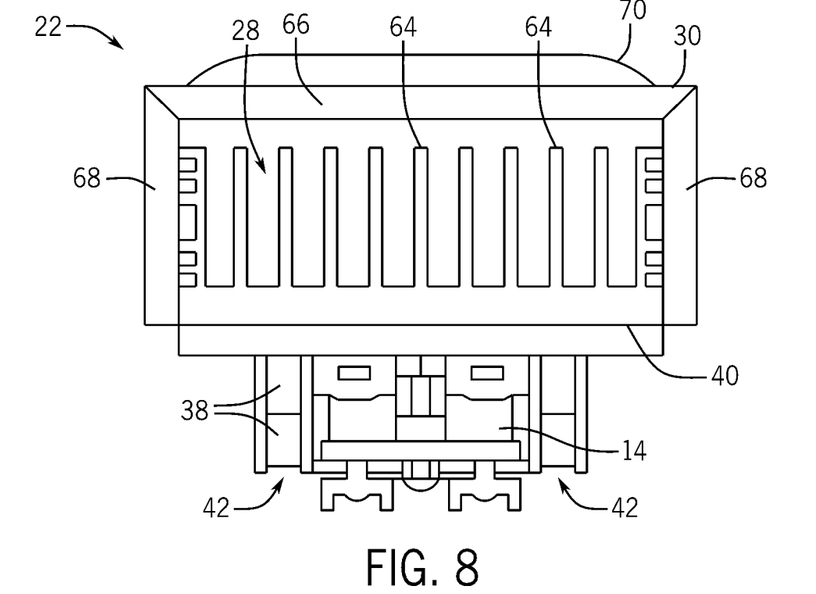
FIG. 8 is a top view of the SSR module of FIG. 4.
Figure 10:
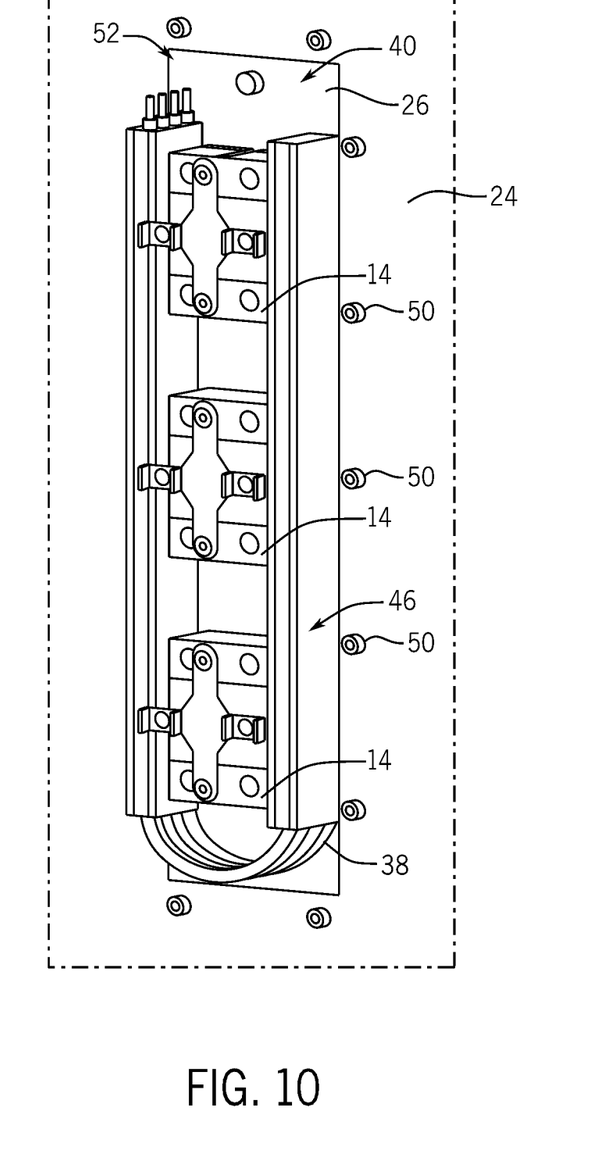
FIG. 10 is an internal isometric view of the SSR module of FIG. 4 coupled to the electronics enclosure of FIG. 2.
Figure 11:
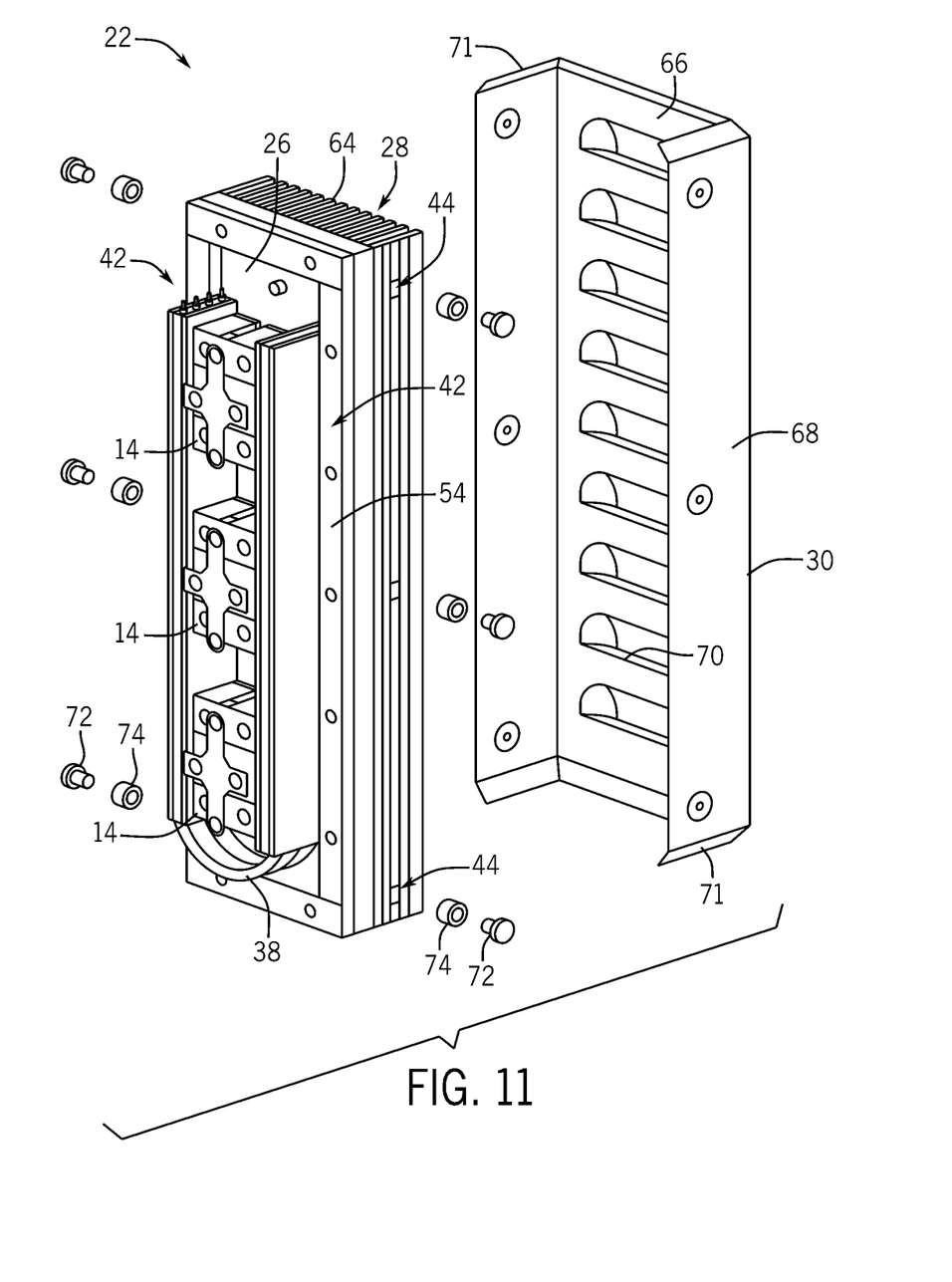
FIG. 11 is an isometric exploded view of the SSR module of FIG. 4.

The base 40 can be coupled to the electronics enclosure 20. More specifically, in some embodiments, as shown in FIG. 10, the first side 46 of the base 40 can be mounted to a wall 24 of the electronics enclosure 20 (e.g., an outside of the wall 24), via fasteners 50, so that the cable channels 42 extend into the electronics enclosure 20 via a hole 52 in the wall 24. Additionally, in some embodiments, a gasket 54, such as a silicone gasket, as shown in FIGS. 4, 6, and 11, can be positioned between the first side 46 and the wall 24 to help seal an interior of the electronics enclosure 20. In some embodiments, the base 40 may be formed of a material suitable for heat transfer, such as aluminum or another metal.

Figure 12:
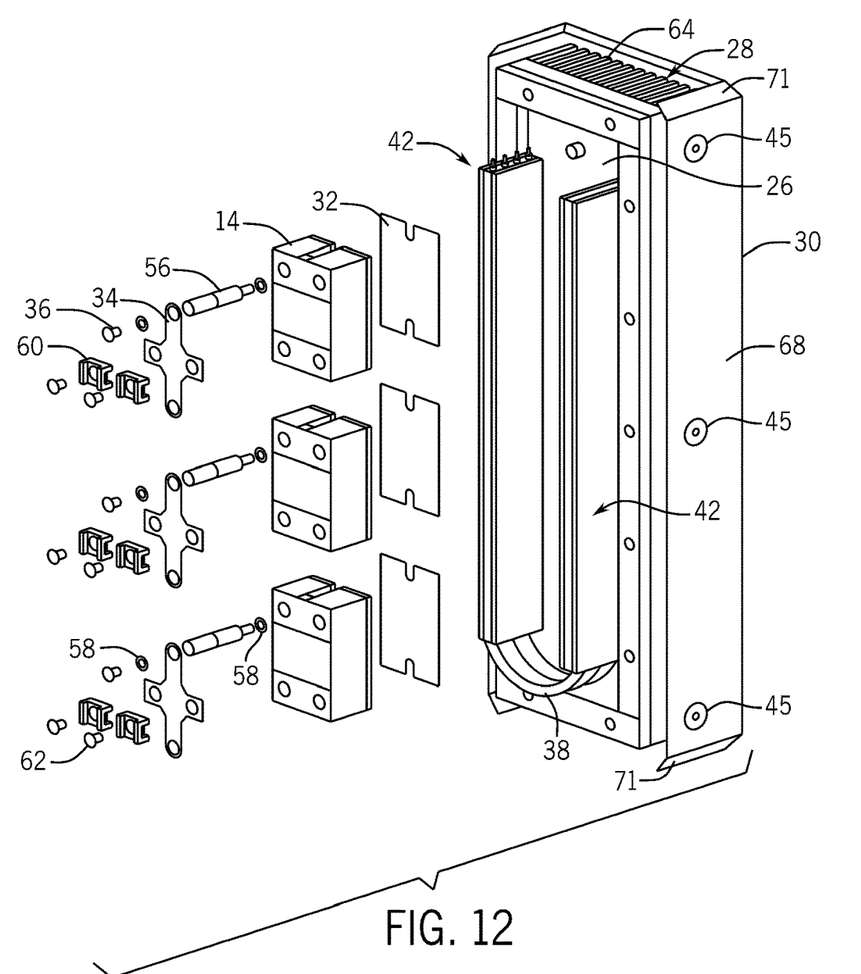
FIG. 12 is another isometric exploded view of the SSR module of FIG. 4.

Referring to components of the base 40, the SSR platform 26 can be sized to receive the one or more SSRs 14. For example, as shown in FIG. 9, the SSR platform 26 can be positioned between two parallel cable channels 42. In some embodiments, the cable channels 42 can be spaced apart a distance substantially equal to a width of an SSR 14 so that SSRs 14 received on the SSR platform 26 are snuggly fit between the channels 42. Furthermore, as shown in FIG. 12, for each respective SSR 14, a thermal pad 32 may be positioned against the SSR platform 26, the SSR 14 can be placed against the thermal pad 32, and a mounting plate 34, the thermal pad 32, and the SSR 14 can be coupled to the SSR platform 26 via standoffs 56, washers 58, and the fasteners 36. Furthermore, in some embodiments, as shown in FIG. 12, one or more cable tie bases 60 can be coupled to the mounting plate 34 via fasteners 62.

In such an arrangement, heat generated by the SSRs 14 can travel from the SSRs 14 to the thermal pads 32, to the SSR platform 26. Furthermore, as noted above, the heat sink 28 can be positioned along the opposite side 48 of the base 40 as the SSR platform 26. More specifically, as shown in FIG. 9, the heat sink 28 can include a plurality of fins 64 extending away from the SSR platform 26. Thus, heat generated by each SSR 14 can travel through the thermal pad 32 to the SSR platform 26, to be released to the outside environment through the fins 64. In some embodiments, the fins 64 can extend an entire length of the base 40. However, in other embodiments, the fins 64 may extend a portion or portions of the entire length of the base 40.

Accordingly, the heat sink 28 can act to release heat generated by the SSRs 14 outside of the electronics enclosure 20, for example, so that such heat is not trapped within the electronics enclosure 20. Furthermore, the cover 30 can act to cover the heat sink 28 to generally help protect the heat sink 28 from outside elements, while still allowing for efficient air flow across the fins 64 for heat release when needed. However, in cold conditions, the cover 30 can also protect the heat sink 28 from, for example, cold winds. For example, in some embodiments, the cover 30 can include a front 66 and two ends 68 extending substantially perpendicular from the front 66. The cover 30 can have a length substantially equal to a length of the base 40. As shown in FIGS. 5, 7, 8, and 11, the front 66 and/or the ends 68 can include one or more vents 70 (such as partially covered openings) so that the cover 30 permits air flow and, thus, heat release, through the vents 70. In some embodiments, the two ends 68 function as a wind cover for balancing heat capture under cold, windy conditions with heat release via the fins 64 of the heat sink 28.

Figure 14:
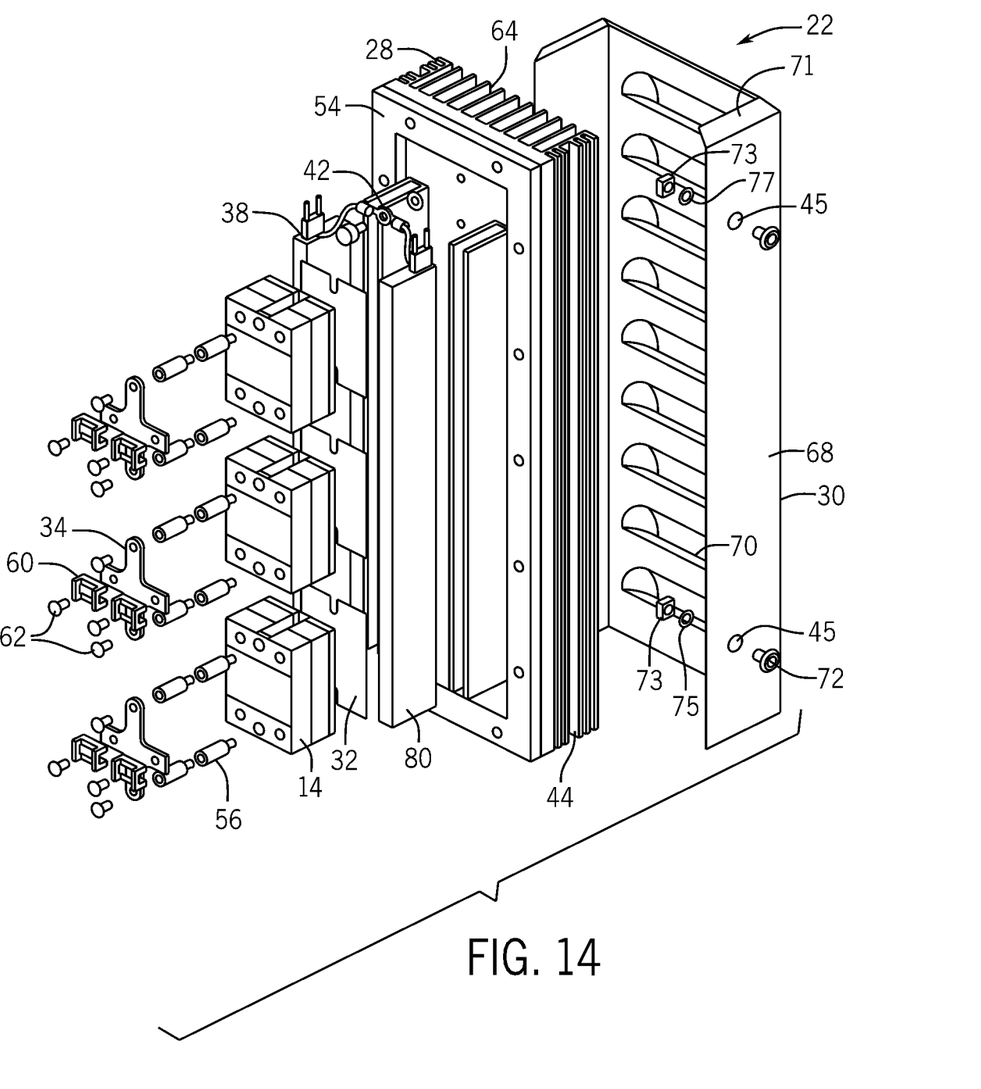
FIG. 14 is an isometric exploded view of an SSR module according to some embodiments.

Additionally, in some embodiments, a top and/or bottom of the cover 30 may be substantially open to permit air flow past the fins 64 of the heat sink 28. For example, in some embodiments, as shown in FIGS. 4-7, 11, and 12, the cover 30 can include angled top and bottom edges 71 that extend into an open top and an open bottom. In some embodiments, as shown in FIG. 14, the cover 30 can include angled top edges 71 extending into an open top, and a completely open bottom (e.g., with no angled edges extending therein). In yet other embodiments, the cover 30 may include a top wall and/or a bottom wall (not shown), or may include angled bottom edges 71 extending into an open bottom, and a completely open top (e.g., with no angled edges extending therein).

In some embodiments, the cover 30 can be coupled to the base 40, for example, at the cover mounting sections 44 of the base 40. For example, as shown in FIGS. 9 and 11, the cover mounting sections 44 can be located at the outermost fins 64 and extend a length of the base 40. The cover 30 can be coupled to the base 40 at the cover mounting sections 44 via fasteners 72 and insulating spacers 74. For example, the cover 30 can include one or more cover mounting holes 45 on each side, through which a fastener 72 can extend, to be coupled to a spacer 74 within the cover mounting section 44. The insulating spacers 74 can help prevent or minimize direct heat transfer between the cover 30 and the base 40. In some embodiments, as shown in FIG. 14, the cover 30 can be coupled to the base at the cover mounting sections 44 via fasteners 72, nuts 73, and washers 75. Also, at one of the cover mounting sections 44, a washer tooth 77 can be used and act as a cover grounding point.

In some embodiments, as shown in FIGS. 4-7, 11, and 12, the cover 30 can include three cover mounting holes 45 along each side. In other embodiments, as shown in FIG. 14, the cover 30 can include two cover mounting holes 45 along each side. In yet other embodiments, the cover 30 can include one, four, or more cover mounting holes 45 along each side, or along the front, top, or bottom. Additionally, in some embodiments, the cover 30 can comprise 304 stainless steel or a similar all-weather resistant material.

While the SSR module 22 acts to release heat generated by the SSRs 14, in some conditions, the SSR module 22 must be heated. That is, in extreme environments in which electronic enclosures 20 may be operated, temperatures may reach as low as −55 degrees Celsius (° C.) or even colder. Electronic components such as SSRs 14, however, are often only rated for operation in temperatures of, for example, −40° C. or warmer, and may malfunction or even suffer permanent damage if operated at excessively low temperatures. Thus, to enable operation at very low temperatures, the SSR modules 22 may be configured to preheat the SSRs 14 to a "safe" operating temperature (such as at least to a baseline operating temperature). Accordingly, in some embodiments, during operation, a controller and/or additional components (not shown) can operate the heating cable(s) 38 and/or the SSRs 14 based on a sensed temperature within the electronics enclosure 20, as further described below.

As noted above, the SSR module 22 and, more specifically, the base 40, can include one or more channels 42 configured to receive a portion of a heating cable 38 for locally heating an SSR 14 mounted thereon. Referring back to FIG. 9, in some embodiments, each cable channel 42 may be defined by parallel channel walls 76 extending from a channel bottom 78. The channel walls 76 may be formed of a material suitable for heat transfer, such as aluminum or another metal. As the SSR platform 26 can be positioned between the cable channels 42, heat generated by heating cables 38 within the channels 42 can help heat the SSRs 14 positioned therebetween. Alternatively, in some embodiments, the SSR module 22 may only include a single cable channel 42 positioned adjacent the SSR platform 26.

As shown in FIGS. 4, 6, 11, and 12, the cable channels 42 can run at least a portion of a length of the base 40. Furthermore, as shown in FIGS. 4, 6, 11, 12, and 13, one or more heating cables 38 can be routed through a first of the cable channels 42, bent around, and routed through a second of the cable channels 42. In some embodiments, the cable channels 42 can include a height sufficient to accommodate two heating cables 38 stacked over one another. In other embodiments, the cable channels 42 can be sized to accommodate a single heating cable 38, more than two heating cables 38, or multiple heating cables 38 arranged side-by-side.

Figure 13:
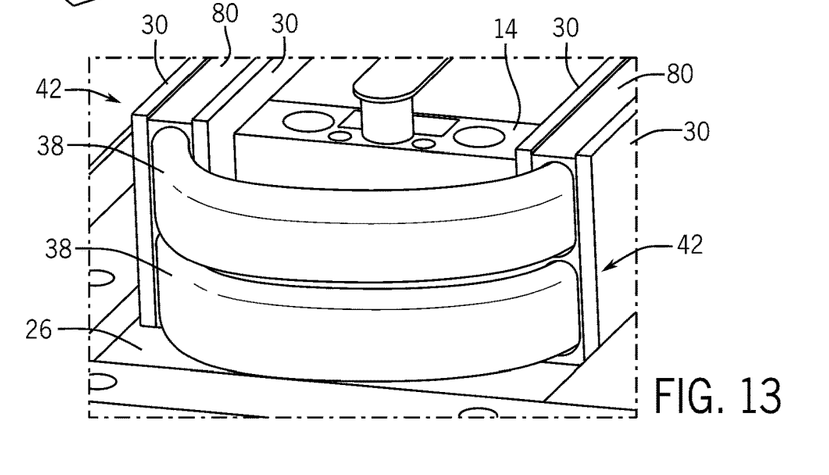
FIG. 13 is a partial, rear isometric view of the SSR module of FIG. 4.

In order to transfer heat from the heating cable 38 to the SSR module 14, a heating cable 38 can be potted in a respective channel 42 with a heat transfer medium, such as a two-component polyurethane (PU) compound 80 or another suitable compound, as shown in FIG. 13. For example, the heating cable 38 can positioned within the channel 42 (i.e., between the channel walls 76) and a potting compound (such as a PU compound 80) is poured into the channel 42 over the heating cable 38, then left to cure.

Alternatively, in some embodiments, the heating cables 38 can be pre-encapsulated with the potting compound (e.g., PU compound 80) and then inserted into a respective channel 42, as shown in FIG. 13, thus eliminating the need for in-channel potting and curing. For example, the heating cables 38 can be pre-encapsulated according to the methods described in U.S. application Ser. No. 17/556,172, filed Dec. 20, 2021, the entire contents of which is incorporated herein by reference. For example, one or more lengths of a heating cable 38 is encapsulated with PU compound 80 and cured, forming a PU block. The PU block can be sized to correlate with dimensions of the channel 42. More specifically, at least a width of the PU block is sized to be slightly larger than a width of the channel 42 so that, when the PU block is pushed into the channel 42, the PU block is compressed into the channel 42 to create a press-fit coupling. This tight fit can provide constant contact between the PU block and walls of the channel 42 for optimal heat transfer from the heating cable 38 to the channel walls 76 through the PU block. Additionally, in some embodiments, a length of the PU block may be substantially equivalent to a length of the channel 42, and a height of the PU block may be substantially equivalent to or larger than a height of the channel 42 such that an installed PU block can extend out of the channel 42.

Figure 15:
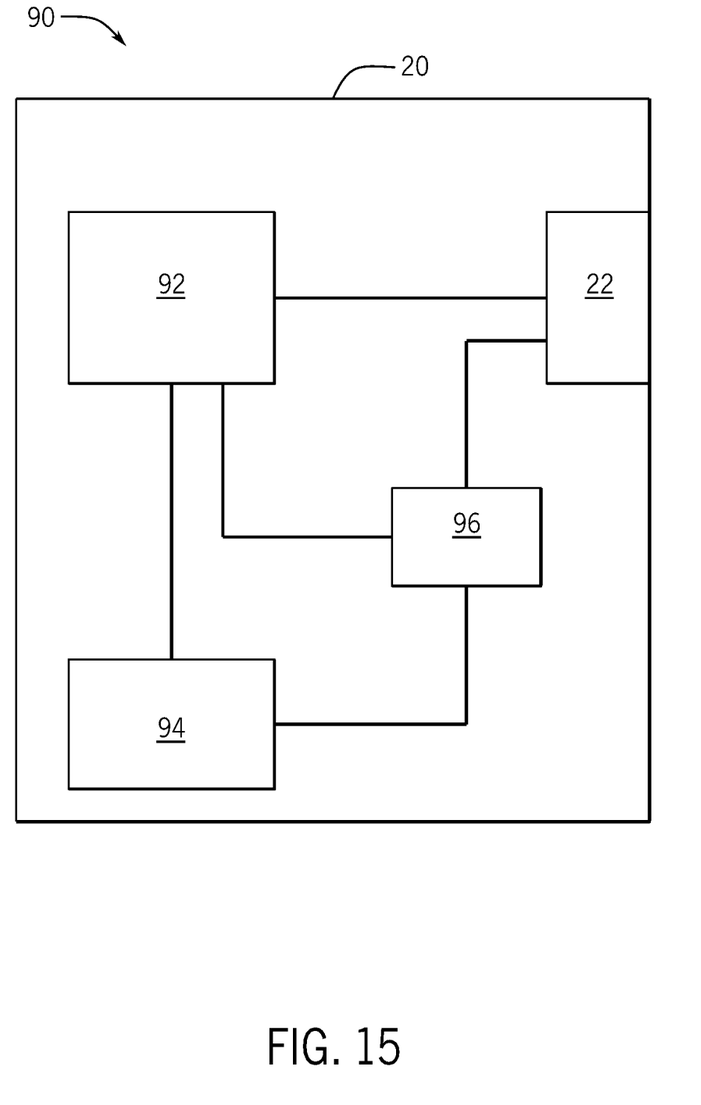
FIG. 15 is a schematic view of a system according to some embodiments.

As noted above, in some embodiments, the heating cable (s) 38 and/or the SSRs 14 can be powered based on a sensed temperature within the electronics enclosure 20. For example, FIG. 15 illustrates a system 90 including the electronics enclosure 20, one or more SSR modules 22, a controller 92, a power source 94, and/or a mechanical thermostat 96. In some embodiments, the controller 92 may be located within the electronics enclosure 20, externally from the electronics enclosure 20, or within the SSR module 22, and can receive a temperature signal. Also, in some embodiments, the power source 94 may be located within the electronics enclosure 20, or may be a power source connection 94 to an external power source.

In some embodiments, the SSRs 14 within the SSR module 22 can be coupled to both the controller 92 and the mechanical thermostat 96. Furthermore, in some embodiments, the mechanical thermostat 96 can be coupled to the controller 92. In some embodiments, the SSRs 14 may be controlled by the controller 92, but also coupled to the power source 94 via the mechanical thermostat 96 within the electronics enclosure 20, wherein the mechanical thermostat 96 only connects power from the power source to the SSRs 14 when a baseline temperature is met. As such, the controller 92 and the mechanical thermostat 96 can be considered part of a control system configured to control the SSR module 22. Additionally, the controller 92 can be coupled to the heating cables 38 within the SSR module 22 and can operate the heating cables 38 when a sensed temperature within the electronics enclosure 20 or outside the electronics enclosure 20 is at or below a predetermined threshold. In some embodiments, the predetermined threshold and the baseline temperature are the same temperature. However, in other embodiments, the predetermined threshold and the baseline temperature are different temperatures. The sensed temperature may be a temperature signal received by the controller 92, for example, as a local temperature from the thermostat 96, a local ambient temperature from an external interface with weather data, or another signal.

Accordingly, within the system 90, the SSRs 14 within the SSR modules 22 are configured to operate at or above a baseline temperature, and the heating cables 38 within the SSR modules 22 are configured to operate at or below a predetermined temperature threshold (e.g., in order to bring the temperature of the SSRs 14 to or above the baseline temperature so that they can be operated). Additionally, it should be noted that, while the examples described herein generally refer to heating cables 38, such examples may also apply to cartridge heaters.

In light of the above, some embodiments provide an SSR module configured to heat or cool solid state relays of an electronics enclosure depending on outside conditions. That is, the SSR module is configured to provide sufficient heat dissipation from SSRs when needed, as well as provide localized heating for bringing SSRs to a suitable operating temperature when needed. Both heating and cooling can be accomplished through a single body, which may accommodate heating cables adjacent the SSRs as well as cooling fins of a heat sink adjacent the SSRs. Furthermore, a wind cover balances heat capture under cold, windy conditions with heat release via the cooling fins of the heat sink under other conditions when needed.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A solid state relay module configured to be coupled to an electronics enclosure and to receive a solid state relay, the solid state relay module comprising:
    a base including a first side and an opposite second side, the base to be coupled to the electronics enclosure;
    two cable channels extending from the first side of the base, each of the two cable channels sized to receive a heating cable;
    a solid state relay platform defined on the base between the two cable channels, the solid state relay platform sized to receive a solid state relay; and
    a heat sink extending from the second side of the base.

2. The solid state relay module of claim 1, further comprising a cover coupled to the base around the heat sink.

3. The solid state relay module of claim 2, wherein the cover includes a vented opening.

4. The solid state relay module of claim 2, wherein the cover is coupled to the base via fasteners and insulated spacers.

5. The solid state relay module of claim 2, wherein the cover includes a front and two ends extending perpendicular from the front.

6. The solid state relay module of claim 5, wherein the cover includes an open top and an open bottom.

7. The solid state relay module of claim 1, wherein the heat sink comprises a plurality of fins extending from the second side of the base.

8. The solid state relay module of claim 1, wherein a single heating cable is routed through both of the two cable channels.

9. The solid state relay module of claim 1, wherein the base is to be coupled to a wall of the electronics enclosure so that the two cable channels extend into the electronics enclosure and the heat sink extends out of the electronics enclosure.

10. The solid state relay module of claim 9, further comprising a gasket to be positioned between the base and the wall.

11. The solid state relay module of claim 1, wherein the heating cable is configured to heat the solid state relay to a baseline operating temperature.

12. A solid state relay module configured to be coupled to an electronics enclosure and to receive a solid state relay, the solid state relay module comprising:
    a base including a first side and an opposite second side, the base to be coupled to the electronics enclosure;
    a cable channel extending from the first side of the base, the cable channel sized to receive a heating cable;
    a solid state relay platform positioned on the base adjacent to the cable channel, the solid state relay platform sized to receive a solid state relay; and
    a heat sink extending from the second side of the base.

13. The solid state relay module of claim 12, wherein the base is to be coupled to a wall of the electronics enclosure so that the cable channel extends into the electronics enclosure and the heat sink extends out of the electronics enclosure.

14. The solid state relay module of claim 13, further comprising a gasket to be positioned between the base and the wall.

15. The solid state relay module of claim 12, wherein the solid state relay platform and the heat sink are formed integrally as a single base.

16. A system comprising:
    an electronics enclosure;
    a solid state relay module coupled to the electronics enclosure, the solid state relay module including:
        a solid state relay and a heating cable positioned within the electronics enclosure, and
        a heat sink positioned outside the electronics enclosure; and
    a control system configured to:
        receive a first signal representing a temperature within the electronics enclosure,
        operate the solid state relay when the temperature within the electronics enclosure is at or above a first temperature, and operate the heating cable when the temperature within the electronics enclosure is below a second temperature.

17. The system of claim 16, wherein the control system includes a controller and a mechanical thermostat, wherein the solid state relay is coupled to a power source via the mechanical thermostat.

18. The system of claim 17, wherein the mechanical thermostat connects power from the power source to the solid state relay when the first temperature is reached.

19. The system of claim 16, wherein the control system is located within the electronics enclosure.

20. The system of claim 16, wherein the first temperature and the second temperature are equal.

* * * * *